US012126964B2

(12) United States Patent
Webster et al.

(10) Patent No.: US 12,126,964 B2
(45) **Date of Patent: *Oct. 22, 2024**

(54) HEARING DEVICE ANTENNA WITH OPTIMIZED ORIENTATION

(71) Applicant: Starkey Laboratories, Inc., Eden Prairie, MN (US)

(72) Inventors: Trevor Webster, Minneapolis, MN (US); Brent Anthony Bauman, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,521

(22) Filed: Aug. 1, 2023

(65) Prior Publication Data

US 2024/0114297 A1 Apr. 4, 2024

Related U.S. Application Data

(63) Continuation of application No. 16/562,026, filed on Sep. 5, 2019, now Pat. No. 11,758,339, which is a continuation of application No. 15/136,197, filed on Apr. 22, 2016, now Pat. No. 10,412,514.

(51) Int. Cl.
*H04R 25/00* (2006.01)

(52) U.S. Cl.
CPC .......... *H04R 25/554* (2013.01); *H04R 25/70* (2013.01); *H04R 25/552* (2013.01); *H04R 2225/021* (2013.01); *H04R 2225/51* (2013.01)

(58) Field of Classification Search
CPC .... H04R 25/554; H04R 25/70; H04R 25/552; H04R 2225/021; H04R 2225/51; H04R 25/602; H04R 25/558; H04R 25/33; H04R 2460/17; H04R 2225/31; H01Q 1/084; H01Q 1/245; H01Q 1/244; H04B 1/3833
See application file for complete search history.

(56) References Cited

U.S. PATENT DOCUMENTS

| | | | |
|---|---|---|---|
| 5,940,039 | A | 8/1999 | Wang et al. |
| 6,285,327 | B1 | 9/2001 | See |
| 7,593,538 | B2 | 9/2009 | Polinske |
| 7,791,551 | B2 | 9/2010 | Platz |
| 8,565,457 | B2 | 10/2013 | Polinske et al. |
| 8,699,733 | B2 | 4/2014 | Polinske et al. |
| 9,191,757 | B2 | 11/2015 | Bauman et al. |

(Continued)

OTHER PUBLICATIONS

"U.S. Appl. No. 14/267,603, Final Office Action mailed Mar. 28, 2016", 6 pgs.

(Continued)

*Primary Examiner* — Angelica M McKinney
(74) *Attorney, Agent, or Firm* — Schwegman Lundberg & Woessner, P.A.

(57) ABSTRACT

A hearing device, such as a hearing aid, includes an antenna for wireless communication. The antenna is housed in the hearing aid with an orientation determined to approximately minimize change in performance of the wireless communication when the hearing aid goes onto a wearer's head from free space. In various embodiments, the orientation of the antenna can be optimized by considering various factors including head loading and performance of wireless communication with various other devices.

24 Claims, 8 Drawing Sheets

(56) References Cited

U.S. PATENT DOCUMENTS

| | | | | |
|---|---|---|---|---|
| 10,231,066 | B2 | 3/2019 | Polinske et al. | |
| 10,412,514 | B2 | 9/2019 | Webster et al. | |
| 10,694,302 | B2 | 6/2020 | Hasani | |
| 10,764,695 | B2 * | 9/2020 | Abadia | H01Q 1/36 |
| 11,758,339 | B2 * | 9/2023 | Webster | H04R 25/70<br>381/315 |
| 2006/0227989 | A1 * | 10/2006 | Polinske | H01Q 1/2283<br>381/322 |
| 2006/0258414 | A1 | 11/2006 | Vance et al. | |
| 2006/0290574 | A1 * | 12/2006 | Tsai | H01Q 1/243<br>343/702 |
| 2007/0080889 | A1 | 4/2007 | Zhang | |
| 2008/0049945 | A1 | 2/2008 | Haenggi et al. | |
| 2008/0159548 | A1 | 7/2008 | Solum | |
| 2008/0169989 | A1 * | 7/2008 | Li | H01Q 21/30<br>343/793 |
| 2008/0304686 | A1 | 12/2008 | Meskens et al. | |
| 2009/0085812 | A1 | 4/2009 | Qi et al. | |
| 2009/0196449 | A1 | 8/2009 | Platz | |
| 2009/0296967 | A1 | 12/2009 | Mullenborn et al. | |
| 2009/0322619 | A1 | 12/2009 | Ollikainen et al. | |
| 2010/0020994 | A1 | 1/2010 | Christensen et al. | |
| 2010/0120466 | A1 | 5/2010 | Li | |
| 2010/0156728 | A1 | 6/2010 | Alvey et al. | |
| 2010/0158291 | A1 | 6/2010 | Polinske et al. | |
| 2010/0158293 | A1 | 6/2010 | Polinske et al. | |
| 2010/0158295 | A1 | 6/2010 | Polinske et al. | |
| 2010/0164812 | A1 | 7/2010 | Ganeshan et al. | |
| 2011/0156972 | A1 | 6/2011 | Korva et al. | |
| 2012/0032862 | A1 | 2/2012 | Ying | |
| 2012/0087506 | A1 | 4/2012 | Ozden | |
| 2012/0093324 | A1 | 4/2012 | Sinasi | |
| 2013/0069830 | A1 | 3/2013 | Chen et al. | |
| 2013/0342407 | A1 | 12/2013 | Kvist et al. | |
| 2013/0343586 | A1 | 12/2013 | Kvist et al. | |
| 2014/0023216 | A1 | 1/2014 | Solum et al. | |
| 2014/0214123 | A1 | 7/2014 | Janssen | |
| 2014/0328507 | A1 | 11/2014 | Rabel et al. | |
| 2015/0016645 | A1 | 1/2015 | Bauman et al. | |
| 2015/0023539 | A1 | 1/2015 | Bauman | |
| 2015/0030190 | A1 * | 1/2015 | Rabel | H04R 25/658<br>381/315 |
| 2015/0049891 | A1 | 2/2015 | Johnson et al. | |
| 2015/0117687 | A1 | 4/2015 | Shcherbatko et al. | |
| 2015/0124976 | A1 | 5/2015 | Pedersen et al. | |
| 2015/0296311 | A1 | 10/2015 | Bauman | |
| 2016/0366525 | A1 | 12/2016 | Bodvarsson | |
| 2017/0311103 | A1 | 10/2017 | Webster et al. | |
| 2018/0084351 | A1 | 3/2018 | Polinske et al. | |
| 2018/0131218 | A1 | 5/2018 | Shellhammer et al. | |
| 2019/0327568 | A1 | 10/2019 | Pooladian et al. | |
| 2019/0394587 | A1 | 12/2019 | Webster et al. | |
| 2020/0044323 | A1 | 2/2020 | Oesch et al. | |
| 2021/0235205 | A1 | 7/2021 | Sundberg et al. | |

OTHER PUBLICATIONS

"U.S. Appl. No. 14/267,603, Final Office Action mailed Sep. 18, 2015", 12 pgs.

"U.S. Appl. No. 14/267,603, Non Final Office Action mailed May 15, 2015", 12 pgs.

"U.S. Appl. No. 14/267,603, Non Final Office Action mailed Dec. 9, 2015", 7 pgs.

"U.S. Appl. No. 14/267,603, Response filed Mar. 9, 2016 to Non Final Office Action mailed Dec. 9, 2015", 8 pgs.

"U.S. Appl. No. 14/267,603, Response filed Aug. 17, 2015 to Non Final Office Action mailed May 15, 2015", 9 pgs.

"U.S. Appl. No. 14/267,603, Response filed Nov. 17, 2015 to Final Office Action mailed Sep. 18, 2015", 9 pgs.

"U.S. Appl. No. 15/136,197, Advisory Action mailed Jan. 5, 2018", 4 pgs.

"U.S. Appl. No. 15/136,197, Examiner-Initiated Interview Summary mailed Jan. 5, 2017", 1 pg.

"U.S. Appl. No. 15/136,197, Final Office Action mailed Feb. 7, 2019", 20 pgs.

"U.S. Appl. No. 15/136,197, Final Office Action mailed Sep. 21, 2017", 21 pgs.

"U.S. Appl. No. 15/136,197, Non Final Office Action mailed Mar. 24, 2017", 22 pgs.

"U.S. Appl. No. 15/136,197, Non Final Office Action mailed Jul. 26, 2018", 20 pgs.

"U.S. Appl. No. 15/136,197, Notice of Allowance mailed Apr. 29, 2019", 7 pgs.

"U.S. Appl. No. 15/136,197, Response filed Jan. 30, 2018 to Advisory Action mailed Jan. 5, 2018", 10 pgs.

"U.S. Appl. No. 15/136,197, Response filed Apr. 8, 2019 to Final Office Action mailed Feb. 7, 2019", 10 pgs.

"U.S. Appl. No. 15/136,197, Response Filed Jun. 26, 2017 to Non Final Office Action mailed Mar. 24, 2017", 20 pgs.

"U.S. Appl. No. 15/136,197, Response Filed Oct. 25, 2018 to Non Final Office Action mailed Jul. 26, 2018", 10 pgs.

"U.S. Appl. No. 15/136,197, Response filed Nov. 21, 2017 to Final Office Action mailed Sep. 21, 2017", 10 pgs.

"U.S. Appl. No. 16/562,026, Advisory Action mailed Oct. 22, 2021", 3 pgs.

"U.S. Appl. No. 16/562,026, Appeal Brief filed Feb. 8, 2022", 21 pgs.

"U.S. Appl. No. 16/562,026, Appeal Decision mailed Mar. 31, 2023", 11 pgs.

"U.S. Appl. No. 16/562,026, Decision on Pre-Appeal Brief Request for Review mailed Nov. 30, 2021", 2 pgs.

"U.S. Appl. No. 16/562,026, Examiner's Answer mailed Apr. 1, 2022", 8 pgs.

"U.S. Appl. No. 16/562,026, Final Office Action mailed Feb. 5, 2021", 15 pgs.

"U.S. Appl. No. 16/562,026, Final Office Action mailed Aug. 9, 2021", 14 pgs.

"U.S. Appl. No. 16/562,026, Non Final Office Action mailed Apr. 22, 2021", 13 pgs.

"U.S. Appl. No. 16/562,026, Non Final Office Action mailed Jul. 28, 2020", 17 pgs.

"U.S. Appl. No. 16/562,026, Notice of Allowance mailed May 1, 2023", 7 pgs.

"U.S. Appl. No. 16/562,026, Pre-Appeal Brief Request for Review filed Nov. 9, 2021", 5 pgs.

"U.S. Appl. No. 16/562,026, Reply Brief filed May 19, 2022", 5 pgs.

"U.S. Appl. No. 16/562,026, Response filed Apr. 5, 2021 to Final Office Action mailed Feb. 5, 2021", 8 pgs.

"U.S. Appl. No. 16/562,026, Response filed Jul. 22, 2021 to Non Final Office Action mailed Apr. 22, 2021", 11 pgs.

"U.S. Appl. No. 16/562,026, Response filed Oct. 12, 2021 to Final Office Action mailed Aug. 9, 2021", 13 pgs.

"U.S. Appl. No. 16/562,026, Response filed Oct. 28, 2020 to Non Final Office Action mailed Jul. 28, 2020", 11 pgs.

"European Application Serial No. 17167366.8, Communication Pursuant to Article 94(3) EPC mailed Jul. 17, 2018", 6 pgs.

"European Application Serial No. 17167366.8, Extended European Search Report mailed Aug. 16, 2017", 9 pgs.

Zhang, Jiaying, "Antenna Miniaturization in Complex Electromagnetic Environments: Designs and Measurements of Electrically Small Antennas for Hearing-Aid Applications", Technical University of Denmark, (Feb. 2011), 219 pgs.

* cited by examiner

HEARING DEVICE ANTENNA WITH OPTIMIZED ORIENTATION

CROSS REFERENCE TO RELATED APPLICATIONS

The present application is a continuation of U.S. patent application Ser. No. 16/562,026, filed Sep. 5, 2019, which is a continuation of U.S. patent application Ser. No. 15/136,197, filed Apr. 22, 2016, now issued as U.S. Pat. No. 10,412,514, which is related to U.S. patent application Ser. No. 14/267,603, entitled "HEARING ASSISTANCE DEVICE WITH ANTENNA OPTIMIZED TO REDUCE HEAD LOADING", filed May 1, 2014, published as US 2015/0030190, which claims the benefit of priority under 35 U.S.C. § 119(e) to U.S. Provisional patent application Ser. No. 61/815,365, filed May 1, 2013, which are incorporated by reference herein in their entirety.

TECHNICAL FIELD

This document relates generally to hearing systems and more particularly to a hearing device that includes an antenna with orientation optimized for wireless communications.

BACKGROUND

Hearing devices provide sound for the wearer. Some examples of hearing devices are headsets, hearing aids, speakers, cochlear implants, bone conduction devices, and personal listening devices. Hearing aids provide amplification to compensate for hearing loss by transmitting amplified sounds to their ear canals. In various examples, a hearing aid is worn in and/or around a patient's ear. The sounds may be detected from a patient's environment using the microphone in a hearing aid and/or received from a streaming device via a wireless link. Wireless communication may also be performed for programming the hearing aid and receiving information from the hearing aid. In one example, a hearing aid is worn in and/or around a patient's ear. Patients generally prefer that their hearing aids are minimally visible or invisible, do not interfere with their daily activities, and easy to maintain. The hearing aids may include an antenna for the wireless communication, Due to the loading effect of the patient's body on the antenna, there is a need for optimizing performance of the wireless communication without increasing size of a hearing aid.

SUMMARY

A hearing device, such as a hearing aid, may include an antenna for wireless communication. The antenna may be housed in the hearing aid with an orientation determined to approximately minimize change in performance of the wireless communication when the hearing aid goes onto a wearer's head from free space. In various embodiments, the orientation of the antenna can be optimized by considering various factors including head loading and performance of wireless communication with various other devices.

In an exemplary embodiment, a hearing aid includes a housing and an antenna disposed in the housing for performing wireless communication. The hearing ad is for being worn on a head of a wearer. The antenna has an orientation relative to the housing that allows for virtually equivalent free-space performance and on-head performance. The free-space performance is performance of the wireless communication when the hearing aid is in free space. The on-head performance is the performance of the wireless communication when the hearing aid is worn by the wearer.

In an exemplary embodiment, a method for providing a hearing aid with capability for wireless communication is provided. The method includes providing virtually equivalent free-space performance and on-head performance by approximately optimizing an orientation of an antenna in the hearing aid.

In various embodiments, the orientation of the antenna can be optimized by approximately maximizing effects of head loading on the antenna. When needed, the optimization can also include approximately maximizing a gain of the antenna for far-field communication with another device and maintaining at least an approximately minimum channel gain of the antenna for ear-to-ear communication with another hearing aid.

This summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIG. 3A illustrates an antenna orientation resulting a relatively large head loading. FIG. 3B illustrates an antenna orientation resulting a relatively small head loading.

FIG. 4A illustrates the head with Cartesian (XYZ) axes. FIG. 4B illustrates a loop antenna oriented with the normal to the plane of the loop in the direction of the Z-axis. FIG. 4C illustrates the loop antenna oriented with the normal to the plane of the loop in the direction of the Y-axis. FIG. 4D illustrates the loop antenna oriented with the normal to the plane of the loop in the direction of the X-axis.

DETAILED DESCRIPTION

Figure 1:
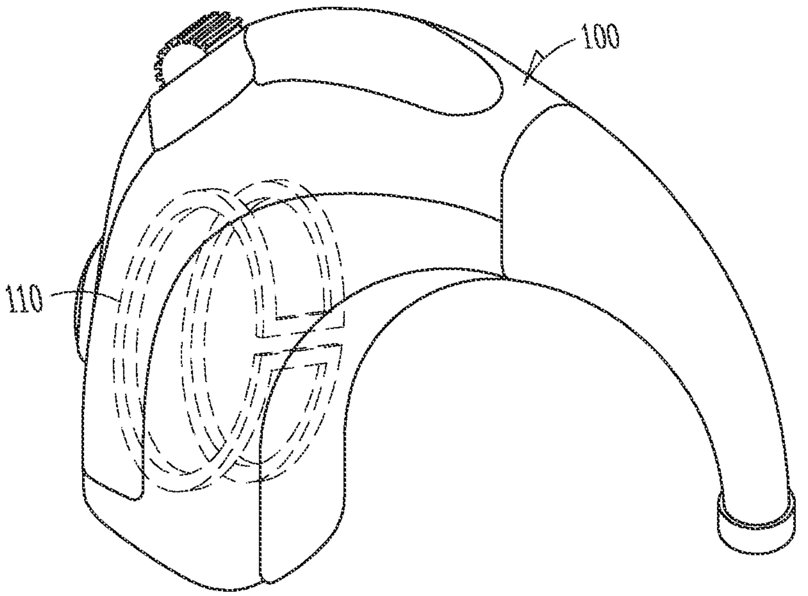
FIG. 1 is an illustration of an exemplary embodiment of a hearing aid including an antenna.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

This document discusses a hearing device including an antenna for wireless communications that is configured and oriented to minimize effects of head loading, which may include dielectric and conductive loading of the body of a wearer of the hearing device on the reactive field of the antenna. The antenna is also configured and oriented to maintain an ear-to-ear communication link with at least a minimum gain and a far-field communication link with a maximum gain when the hearing device, such as a hearing aid, is worn on the head of the wearer. The effects of head loading include the difference between impedance seen at the port of the antenna as measured when the hearing device is placed in an anechoic chamber and that impedance as measured when the hearing device is worn on the head of the wearer.

The antenna of the hearing device when placed next to the wearer's head (or any other dielectric object) will experience a shift in impedance. If this shift in impedance is too large for the matching network between the antenna and the communication electronics of the hearing device to account for at a certain frequency, the wireless communication at that frequency will either operate with degraded performance or become inoperable. Examples of solutions to this problem include adding more capacitor banks to make the matching network tunable and increasing spacing between the antenna and the wearer. However, such solutions increase the complexity, power consumption, size, and/or visibility of the hearing device, none of which is desirable, especially when the hearing device is a hearing aid.

In various embodiments, hearing aids are provided in this document as an example of a hearing device. Forms of wireless communication performed by hearing aids include, but are not limited to, wireless communication between the two hearing aids worn in or about opposite ears of the wearer (referred to as "ear-to-ear" communication) and wireless communication from each of the hearing aids, separately, to one or more peripheral devices (referred to as "far-field" communication). The dielectric and conductive loading effects of the wearer's head on a hearing aid (i.e., the head loading) may affect optimization of the antenna design to diminish the effects of the antenna loading on the matching network while maintaining required performance of wireless communication including the ear-to-ear communication and/or the far-field communication. To achieve these objectives different antenna configurations and/or orientations can be produced. Tradeoffs can be made to enhance one form of communication over others. For example, in various embodiments, configuring an antenna to maximize the power radiated into the far field may diminish the efficiency of the ear-to-ear communication channel. Therefore, the tradeoffs of the various objectives may be adjusted to provide an optimization of the overall performance of the wireless communication of the hearing aid or other hearing device.

In various embodiments, the present subject matter provides a hearing aid with an antenna for wireless communication, with an antenna topology that allows for a minimum channel gain required for communication from one hearing aid to the other (i.e., ear-to-ear communication) and maximizes the radiated power into the far field (i.e., far-field communication). The antenna may be housed in the hearing aid with an orientation determined to approximately minimize effects of head loading on the antenna while maintaining a minimum channel gain required for ear-to-ear communication and a maximum far-field gain for far-field communication. The minimum channel gain provides the minimum amount of signal strength required for a satisfactory performance of the ear-to-ear communication. The maximum far-field gain provides the maximum range of communication between the hearing aid and a peripheral device.

In various embodiments, a hearing aid includes a housing and an antenna disposed in the housing for performing wireless communication. The housing is configured for the hearing aid to be worn on the head of a wearer. The antenna has an orientation relative to the housing that allows for minimal or approximately zero dielectric loading from the head, minimum channel gain for ear-to-ear communication, and maximum far-field gain or radiated power for far-field communication. The change in the matching network needed to accommodate the minimal or approximately zero dielectric loading may be around 25 femtofarads. The channel gain for the ear-to-ear communication is the ratio of the amount of power transferred from the antenna port of the hearing aid to the antenna port of the other hearing aid (of the same pair of binaural hearing aids worn by the same wearer) to the total amount of power transmitted from the communication electronics of the hearing aid. The far-field gain is a measure of directivity of the antenna multiplied by a measure of efficiency of the antenna.

In an example with a "butterfly" antenna, a hearing aid includes an antenna with a loop topology for wireless communication, such as discussed in U.S. Patent Application Publication No. US 2015/0030190 A1, entitled "HEARING-ASSISTANCE DEVICE WITH ANTENNA OPTIMIZED TO REDUCE HEAD LOADING", assigned to Starkey Laboratories, Inc., which is incorporated by reference herein in its entirety. The loop structure is split into two separate elements that are connected to each other with a pair of feed lines. When being put onto the wearer's head, the antenna has two large areas of metal surfaces that directly face the head and the ear. These interfaces have been shown to increase capacitive loading and many decibels of degradation in total far field radiated power when the hearing aids go onto the head compared with the free space conditions. This structure has also been shown to have a channel gain that is substantially greater than what is required to maintain satisfactory performance of the ear-to-ear communication between two hearing aids. The present subject matter provides a solution to such a problem using an optimization method balancing objectives including minimizing or approximately eliminating effects of head loading on the antenna, maintaining a minimum channel gain or signal strength required for the ear-to-ear communication path between the two hearing aids, and maximizing the total radiated power of the individual hearing aid into the far field, when the hearing aid is worn on the head of the wearer. The solution uses antenna dimensions and/or orientation to approximately optimize tradeoffs between these objectives for an application that requires or desires a minimum ear-to-ear communication link strength for communicating with the other hearing aid worn on the opposite ear of the wearer and a maximum far-field communication link strength for communicating with a peripheral device remote from the hearing aid and/or the wearer.

A proper antenna design and orientation can substantially reduce the shift in impedance when the hearing aid is brought from free space to the wearer's head (e.g., in and/or around an ear). The proper antenna design can also provide a minimal amount of channel gain for the ear-to-ear communication path between the two hearing aids. This channel gain is improved when an electrically small dipole is positioned with its highest current flow in the direction perpendicular to the surface of the head of the wearer. This current flow coincides with the direction of the electric field vector for the antenna with the loop topology. A loop antenna has optimal performance when it is oriented with the plane of the loop (i.e., the area enclosed by the loop) parallel to the surface of the head that interface with the hearing aid. However, this loop orientation is not optimal for the far-field communication. To optimize the far-field communication, the normal to the plane of the loop of the antenna should be parallel to the surface of the head that interface with the hearing aid. Such optimal orientations apply to various loop antenna topologies including butterfly and small loop antennas. In this document, "plane of the loop", or "plane enclosed by the loop", refers to the area enclosed by a loop, and in various embodiments, the area enclosed by the loop is planar, approximately planar, or considered to be planar for design and/or optimization purposes.

In various embodiments, the antenna configuration and its orientation in the hearing aid can be approximately optimized and still tuned with one external discrete component (i.e., without using a tunable matching network). This provides for a wireless communication system whose performance is substantially stable when the hearing aid is being put on the wearer and substantially stable across different wearers (with different amount of head loading). In various embodiments, the present subject matter may reduce the size, or maintain the small size, of the hearing aid by eliminating the need for individualized and/or dynamic control of the matching network associated with the antenna.

FIG. 1 is an illustration of an exemplary embodiment of a hearing aid 100 including an antenna 110 for wireless communication with another device. In various embodiments, the wireless communication may include communication between hearing aid 100 and a hearing aid host device, ear-to-ear communication between a pair of hearing aids including hearing aid 100, and/or communication between hearing aid 100 and any other device. In the illustrated embodiment, hearing aid 100 is a behind-the-ear (BTE) type hearing aid, and antenna 110 is a parallel-loop type antenna housed in the case of hearing aid 100. While the BTE type hearing aid and the parallel-loop type antenna are illustrated as an example, the present subject matter is applicable to any type hearing aid or other hearing device with an antenna of any type that may be affected by head loading when being worn by a person. In various embodiments, hearing aid 110 includes a housing, and antenna 110 is placed within the housing.

In various embodiments, antenna 110 is configured with geometrical parameters and/or its orientation in and relative to hearing aid 110 determined to provide the virtually equivalent free-space and on-head performances of the wireless communication based on considerations of effects of head loading. In an exemplary embodiment, given the geometrical parameters, antenna 110 is placed in hearing aid 100 with an orientation that results in an approximately minimum change in head loading when hearing aid 100 goes onto the wearer's head from free space. Such an orientation may correspond to an approximately minimum conductive surface area of antenna 110 facing the head when hearing aid 100 is worn, thereby minimizing the capacitance formed between antenna 110 and the head as well as the change in this capacitance when the distance between antenna 110 and the head changes. In an exemplary embodiment, after the orientation is determined, the effects of head loading are further reduced by approximately optimizing one or more dimensions of antenna 110. An example of a method for approximately optimizing the one or more dimensions is discussed in U.S. Patent Application Publication No. US 2015/0030190 A1. In various embodiments, when the geometrical parameters and/or the orientation of antenna 110 in hearing aid 110 are approximately optimized, the variation in impedance of antenna 110 with changes in the head loading can be approximately minimized for the frequency range of the wireless communication, the required channel gain for the ear-to-ear communication between hearing aid 100 and another hearing aid worn on the opposite ear of the wearer is approximately minimized, and the far-field gain for the far-field communication between hearing aid 100 and another device is approximately maximized.

Figure 2:
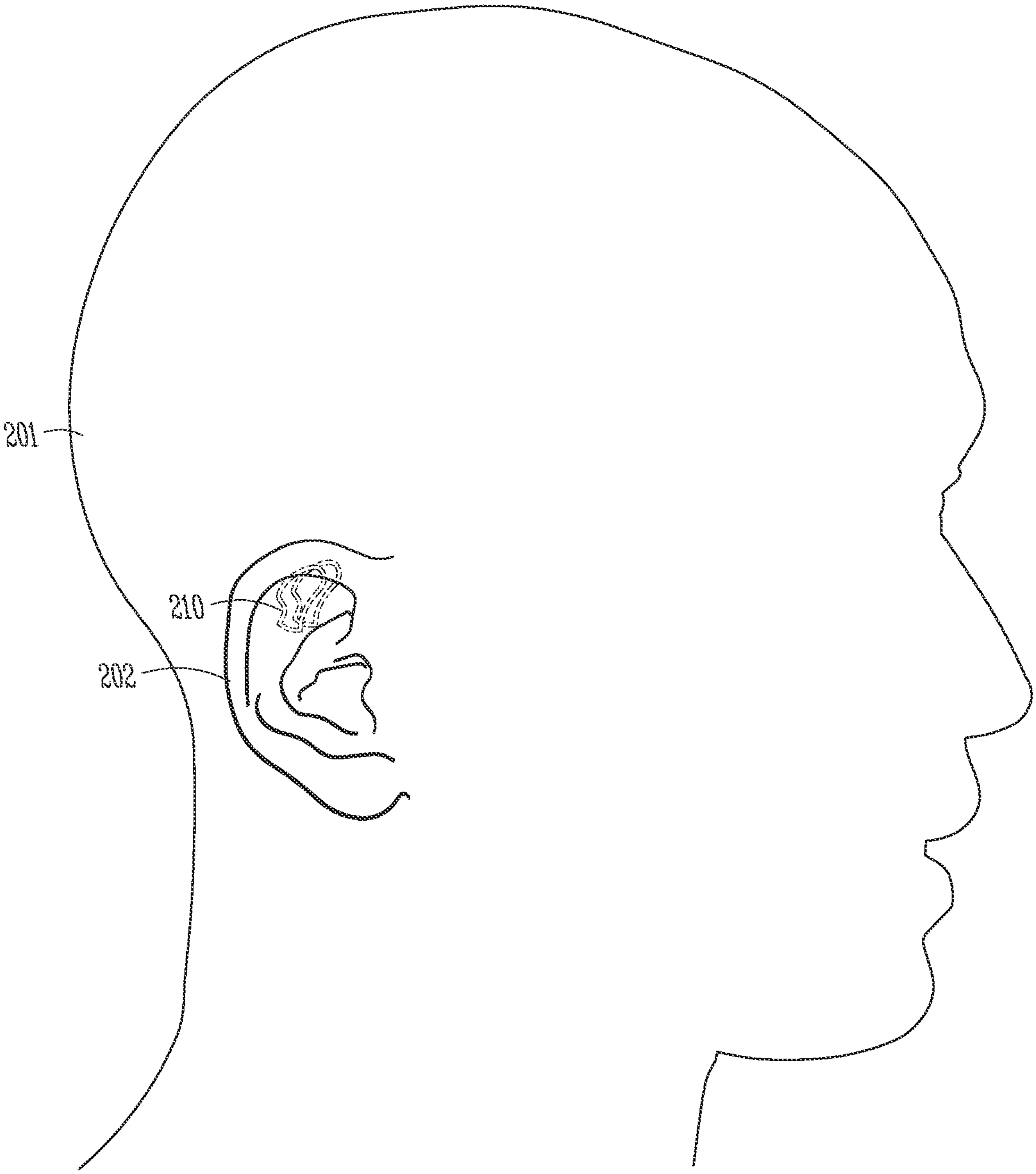
FIG. 2 is an illustration of an exemplary embodiment of the antenna showing its position relative to the head of a hearing aid wearer.

FIG. 2 is an illustration of an exemplary embodiment of an antenna 210 showing its position relative to a head 201 and an ear 202 of a hearing aid wearer. Antenna 210 represents an exemplary embodiment of antenna 110 and has a configuration of the butterfly antenna as a specific example. FIG. 2 illustrates, as a specific example, the position of antenna 210 as a parallel-loop type antenna of a BTE type hearing aid when the hearing aid is worn by the hearing aid wearer.

In various embodiments, antenna 210 can be configured and/or placed in a hearing aid in a way that approximately minimizes change in effective permittivity of antenna 210 when it moves onto ear 202 from free space. One or more factors contributing to the capacitance between antenna 210 and head 201 are identified and approximately minimized. One example of such one or more factors includes the orientation of antenna 210 in the hearing aid. In various embodiments, the total surface area of one or more conductors of antenna 210 that faces head 201 can be approximately minimized while maintaining the function of antenna 210 required for the wireless communication. The one or more conductors may include any conductive material suitable for the required functionality of antenna 210. An example of the one or more conductors includes copper. Examples of the total surface area to be minimized include the areas of surfaces that are approximately parallel to the hearing aid wearer's sagittal plane, or approximately parallel to a portion of the surface of head 201 that is adjacent to antenna 210 when the hearing aid is worn by the hearing aid wearer.

Another example of such one or more factors includes one or more conductor dimensions of antenna 210. In various embodiments, the one or more conductor dimensions of antenna 210 that interfere with head 201 to a degree that results in substantial effective permittivity changes between different wearers and/or environments can be approximately minimized while maintaining the function of antenna 210 required for the wireless communication. The minimization of the one or more conductor dimensions minimizes capacitance variation in antenna 210 between the different wearers and/or environments. In various embodiments, the one or more conductor dimensions are each a dimension of a conductive portion of antenna 210. Examples of the one or more conductor dimensions to be minimized include dimensions of conductive portions of antenna 210 that are measured along directions approximately parallel to the hearing aid wearer's sagittal plane, or approximately parallel to a portion of the surface of head 201 that is adjacent to antenna 210 when the hearing aid is worn by the hearing aid wearer.

Figure 3B:
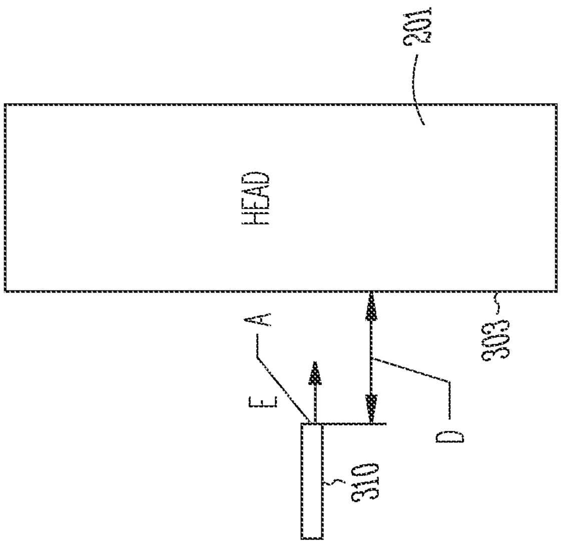
FIGS. 3A-3B are illustrations of an exemplary embodiment of antenna orientation.
Figure 3A:
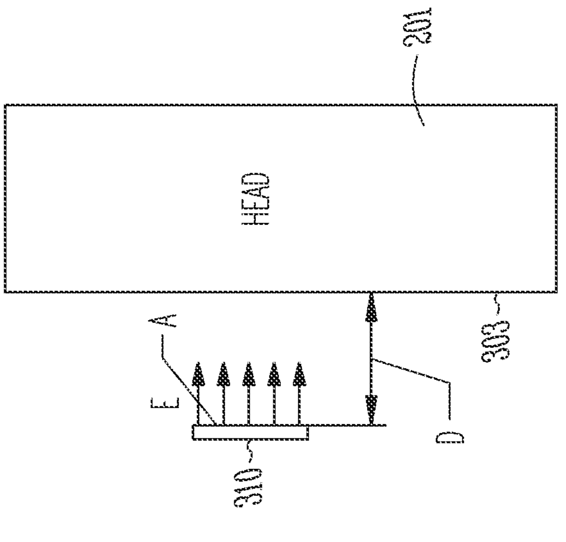

FIGS. 3A and 3B are illustrations of an exemplary embodiment of antenna orientation showing an antenna 310 and head 201. A surface 303 on head 210 represents a portion of the surface of head 201 that is adjacent to antenna 310 when the hearing aid is worn by the hearing aid wearer. Antenna 310 represents any antenna suitable for use in a hearing aid with its orientation in the hearing aid being a significant factor determining the amount of head loading, including any antenna discussed in this document.

FIG. 3A illustrates an orientation of antenna 310 that results in relatively large head loading, while FIG. 3B illustrates an orientation of antenna 310 that results in relatively small head loading. When the hearing aid is worn, antenna 310 has a conductive surface A facing head 201. Surface A represents the total surface of portions of conductor that is about parallel to surface 303. In other words, surface A represents the effective area of antenna 310 that forms a capacitor with surface 303 with the capacitance causing the head loading. The head loading results primarily from the capacitance between antenna 310 and head 201, which is mainly the capacitance between surface A and surface 303. This capacitance is directly proportional to the area of surface A and inversely proportional to the distance d between surface A and surface 303. Thus, to minimize the head loading as well as change in head loading when d changes (such as when the hearing aid is brought to head 210 from free space), the area of surface A (and hence the electric field E associated with the capacitance) is to be minimized. In various embodiments, antenna 310 can be oriented in the hearing aid such that when the hearing aid is worn on head 201, the area of surface A is approximately minimized.

In an exemplary embodiment, antenna 310 is a loop antenna with its side view shown in FIGS. 3A and 3B, FIG. 3A illustrates an approximately worst case (maximum difference between the free-space and on-head performances of the wireless communication), and FIG. 3B illustrated an approximately best case (minimum difference between the free-space and on-head performances of the wireless communication).

In various embodiments, after determining an antenna orientation and/or geometry (one or more dimensions) to approximately minimize the effects of head loading, the antenna configuration and/or orientation can be further optimized for performance of the wireless communication. Depending on the potential applications of the hearing aid with the antenna, the antenna configuration and/or orientation can be further optimized by approximately maximizing the far-field gain and/or by maintaining an approximately minimum channel gain required for ear-to-car communication. An exemplary embodiment of antenna optimization balancing objectives of minimizing head loading while providing satisfactory performance of wireless communication is discussed below with reference to FIGS. 4A-4D.

Figure 4A:
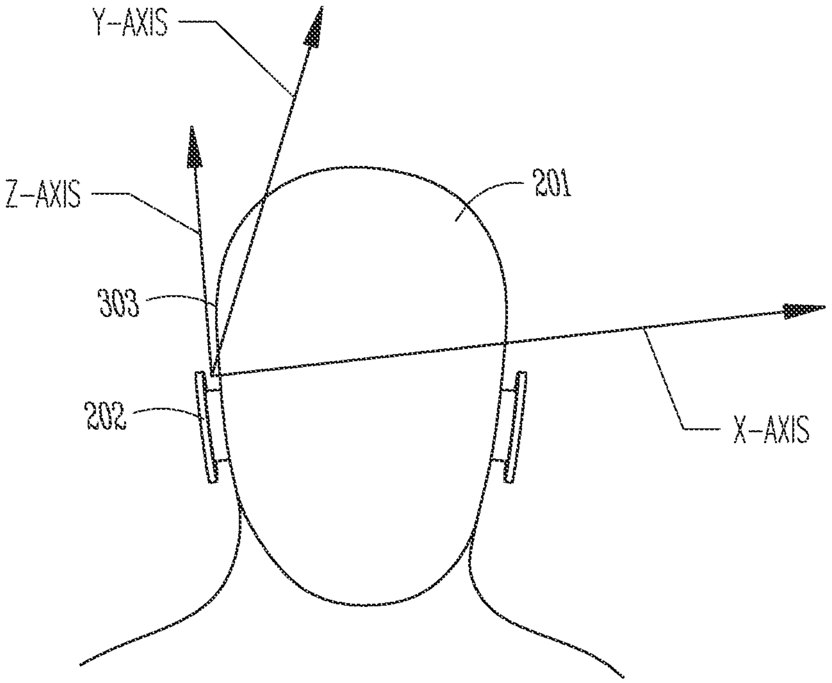
FIGS. 4A-4D are illustrations of orientations of a hearing aid antenna relative to the head of a hearing aid wearer.

FIGS. 4A-4D are illustrations of orientations of a hearing aid antenna. 410 relative to head 201 of a hearing aid wearer. FIG. 4A illustrates the head with Cartesian axes allowing for description of the orientation of antenna 410. As illustrated in each of FIGS. 4A-4D, the Cartesian axes include an X-axis that is perpendicular to surface 303 and pointing into head 201 from surface 303 (lateral direction), a Y-axis that is parallel to surface 303 and pointing front (anterior direction), and a Z-axis that is parallel to surface 303 and pointing up (superior direction). Antenna 410 represents an exemplary embodiment of antenna 310. For many wearers whose surface 303 is approximately parallel to the sagittal plane (also known as the lateral plane), the X-axis is approximately perpendicular to the sagittal plane, approximately parallel to the coronal plane (also known as the frontal plane), and approximately parallel to the transverse plane (also known as the axial or horizontal plane); the Y-axis is approximately parallel to the sagittal plane, approximately perpendicular to the coronal plane, and approximately parallel to the transverse plane; and the Z-axis is approximately parallel to the sagittal plane, approximately parallel to the coronal plane, and approximately perpendicular to the transverse plane.

In the illustrated embodiment, antenna 410 is a loop antenna. In an exemplary embodiment, antenna 410 is a flex circuit antenna including a conductor trace on a flex circuit substrate. An example of such a flex circuit antenna is discussed in U.S. patent application Ser. No. 12/638,720, entitled "PARALLEL ANTENNAS FOR STANDARD FIT HEARING ASSISTANCE DEVICES", filed on Dec. 15, 2009, published as U.S. 2010/0158293, assigned to Starkey Laboratories, Inc., which is incorporated herein by reference in its entirety.

Figure 4D:
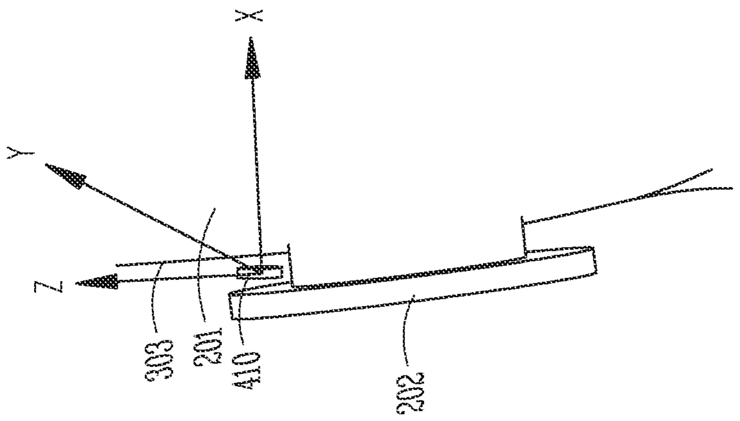
Figure 4C:
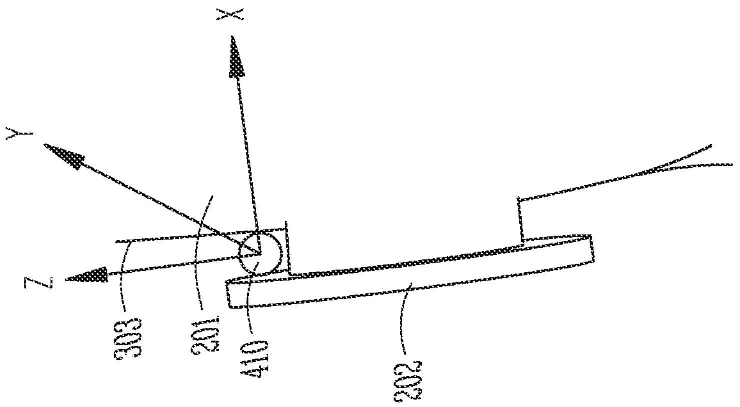
Figure 4B:
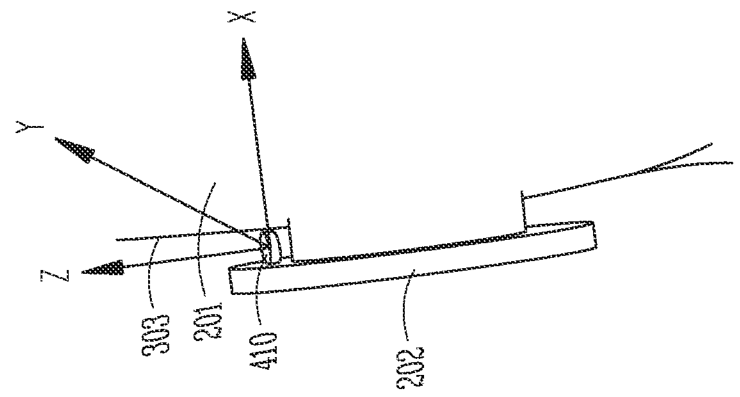

FIG. 4B illustrates antenna 410 oriented with the normal to the area (plane) enclosed by the loop in the direction of the Z-axis. FIG. 4C illustrates antenna 410 oriented with the normal to the plane of the loop in the direction of the Y-axis. FIG. 4D illustrates antenna 410 oriented with the normal to the plane of the loop in the direction of the X-axis. An example of antenna 410 includes a loop having a radius of 4 mm (157.5 mils) (corresponding to a circumference of 25.1 mm (988.2 mils), a height of 2 mm (78.7 mils) and conductor (copper) thickness of 1 mil. A tuning capacitor of 2.78 pF is coupled to this antenna to tune the antenna for wireless communication at 900 MHz (corresponding to free-space wavelength of 333 mm).

In embodiments where binaural hearing devices are used, FIGS. 4B-4D each show one side of the head with one ear, with the other side being symmetric about the sagittal plane. In one exemplary optimization of an antenna such as antenna 410, to minimize head loading, the loop antenna is oriented in a hearing aid such that the normal to the plane of the loop of the antenna is approximately parallel to surface 303, or approximately parallel to the wear's sagittal plane when the hearing aid is worn. In one embodiment, the orientation as illustrated in FIG. 4B is selected for placing a loop antenna such as antenna 410 in a hearing aid. The normal to the plane of the loop of the antenna is approximately in the direction of the Z-axis when the hearing aid is worn. The same orientation of the loop antenna (as illustrated in FIG. 4B) also provides an approximately maximum far-field gain for the wireless communication between the hearing aid and another device that is other than another hearing aid worn on the other side of the head. Such an orientation may provide a small or approximately minimum channel gain for ear-to-ear communication with another hearing aid worn on the other side of the head, when the hearing aid is used as one of the two hearing aids in a binaural hearing aid system. If this small or approximately minimum channel gain is sufficient for a satisfactory performance of the ear-to-ear communication, the orientation as illustrated in FIG. 4B is chosen to be the orientation of the antenna when the hearing aid is worn on the head. If the channel gain for ear-to-ear communication can be further reduced while adjusting the orientation can further increase the far-field gain, the orientation car be adjusted (e.g., by rotating the loop antenna about the X-axis until the far-field gain is approximately maximized while a satisfactory performance of the ear-to-ear communication is maintained. Such adjustment may be performed without substantially changing the head loading as long as the capacitance formed between the surface of the head and the loop antenna is not substantially affected.

Figure 5:
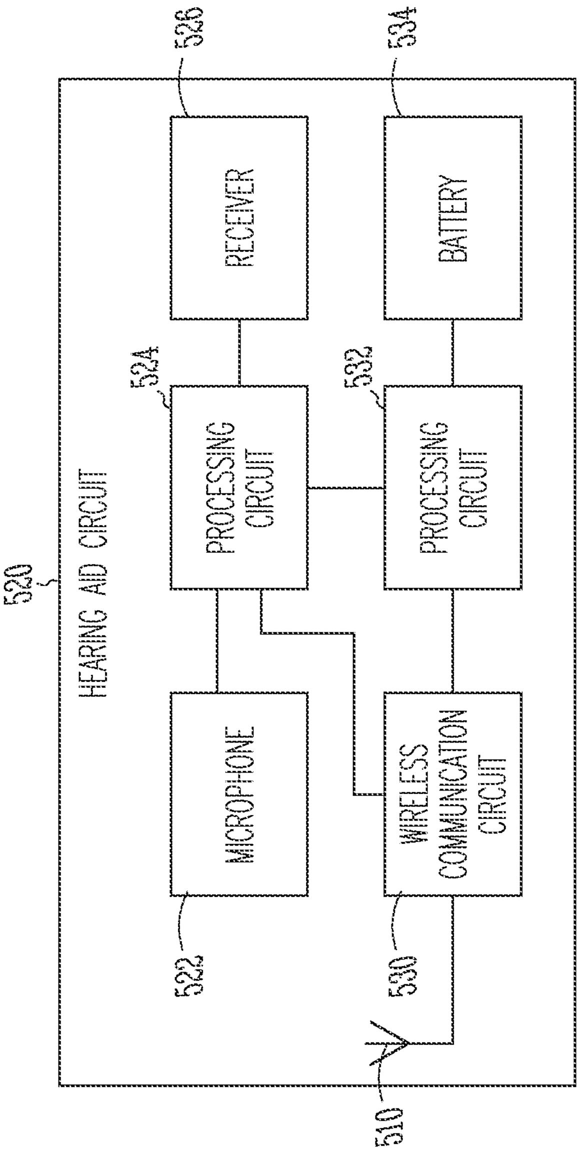
FIG. 5 is a block diagram illustrating an exemplary embodiment of a hearing aid circuit.

FIG. 5 is a block diagram illustrating an exemplary embodiment of a hearing aid circuit 520. Hearing aid circuit 520 represents an example of portions of a circuit of hearing aid 100 and includes a microphone 522, a wireless communication circuit 530, an antenna 510, a processing circuit 524, a receiver (speaker) 526, a battery 534, and a power circuit 532. Microphone 522 receives sounds from the environment of the hearing aid wearer (wearer of hearing aid 100). Communication circuit 530 communicates with another device wirelessly using antenna 510, including receiving programming codes, streamed audio signals, and/or other audio signals and transmitting programming codes, audio signals, and/or other signals. Examples of the other device includes the other hearing aid of a pair of hearing aids for the same wearer, a hearing aid host device, an audio streaming device, a telephone, and other devices capable of communicating with hearing aids wirelessly. Processing circuit 524 controls the operation of hearing aid 100 using the programming codes and processes the sounds received by microphone 522 and/or the audio signals received by wireless communication circuit 530 to produce output sounds. Receiver 526 transmits output sounds to an ear canal of the hearing aid wearer. Battery 534 and power circuit 532 constitute the power source for the operation of hearing aid circuit 520. In various embodiments, power circuit 532 can include a power management circuit. In various embodiments, battery 534 can include a rechargeable battery, and power circuit 532 can include a recharging circuit for recharging the rechargeable battery.

Figure 6:
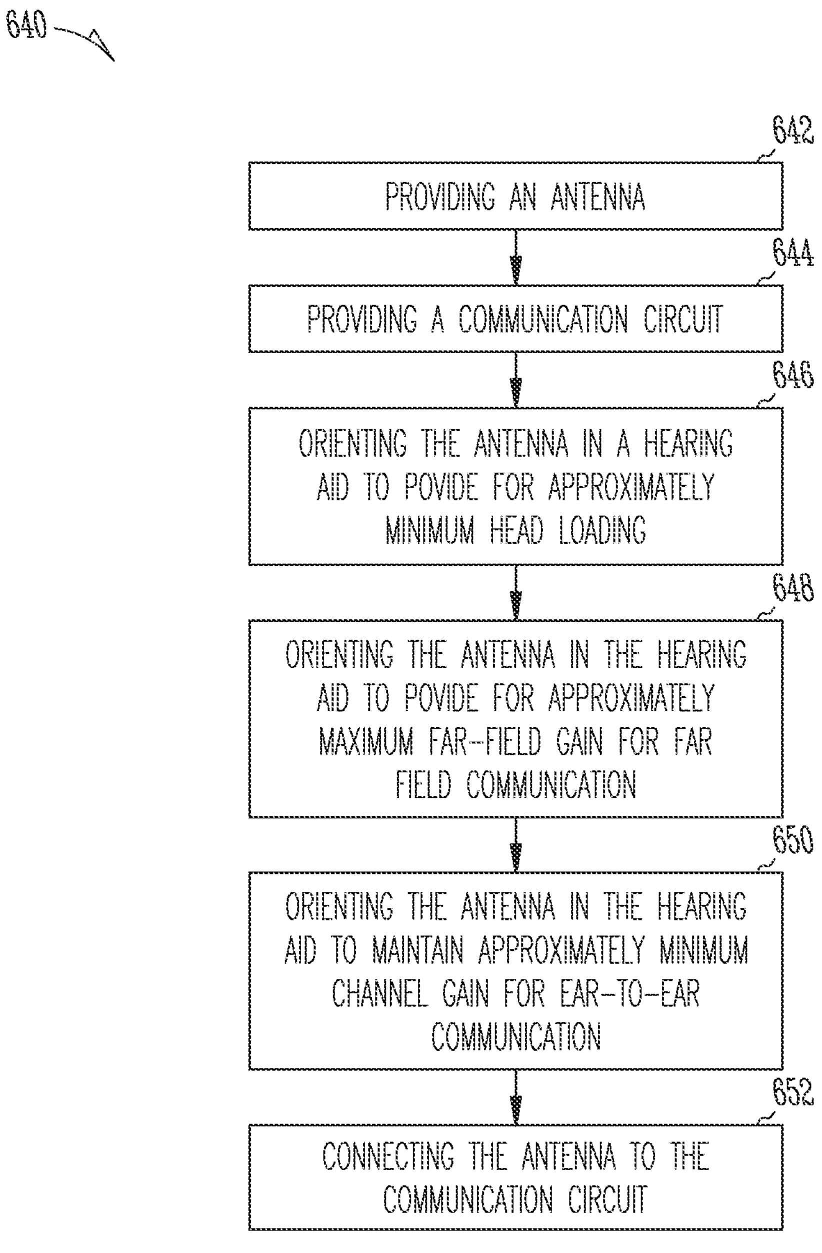
FIG. 6 is a flow chart illustrating an exempla embodiment of a method for making a hearing aid with wireless communication capabilities.

FIG. 6 is a flow chart illustrating an exemplary embodiment of a method 640 for making a hearing aid capable of performing wireless communication with another device. The hearing aid is to be worn on a wearer's head, such as in and/or about the ear of the wearer. In various embodiments, method 640 can be used to make any of the hearing aids discussed in this document.

At 642, an antenna is provided. In an exemplary embodiment, the antenna is a flex circuit antenna. While a MI type hearing aid and loop antennas are discussed above as specific examples, the present subject matter is applicable for any antennas that may interfere with the human body or other object in their use and are therefore subject to various loading effects. The present subject matter is also applicable for any antenna types including, but not limited to dipoles, monopoles, patches, and combinations of such types.

At 644, a communication circuit is provided. The communication circuit is configured to transmit and receive signals using the antenna. In various embodiments, the communication circuit and the antenna can be configured to communicate with another hearing aid worn by the same wearer, a hearing aid host device, and/or any hearing-aid compatible device that transmits signals to and/or receives signals from the hearing aid.

At 646, the antenna is placed in the hearing aid with an orientation determined to provide for approximately minimum head loading on the antenna. This allows for approximately identical on-head performance and free-space performance. The on-head performance is the performance of the wireless communication when the hearing aid is worn by the wearer. The free-space performance is the performance of the wireless communication when the hearing aid is in free space. In various embodiments, the performance of the wireless communication can be measured by parameters such as various received signal strength indicators and various data transmission error rates associated with the wireless communication. In various embodiments, the antenna can be placed in the hearing aid with an orientation for an approximately minimum capacitance between the antenna and the wearer's head when the hearing aid is worn by the wearer. In various embodiments, the antenna can be placed in the hearing aid with an orientation for an approximately minimum conductive surface of the antenna that faces the wearer's head when the hearing aid is worn by the wearer.

At 648, if the hearing aid is to perform far-field communication, the antenna is placed in the hearing aid with the orientation further determined to provide an approximately maximum far-field gain. At 650, if the hearing aid is to perform ear-to-ear communication, the antenna is placed in the hearing aid with the orientation further determined to provide an approximately minimum channel gain required for the hearing aid to perform ear-to-ear communication, or to maintain a channel gain required for the hearing aid to perform ear-to-ear communication. In various embodiments in which the hearing aid is to perform both far-filed communication and ear-to-ear communication, the antenna is placed in the hearing aid with the orientation determined to approximately minimize the head loading while approximately maximizing the far-field gain for the far-field communication and channel gain for the ear-to-ear communication at 646, 648, and 650.

At 652, the antenna is connected to the communication circuit. Steps 642, 644, 646, 648, 650, and 652 are not necessarily performed in any particular order in various embodiments.

In an exemplary embodiment, the antenna may be further optimized by reducing or approximately minimizing a conductor dimension (e.g., size) of the antenna that influences head loading effects on the antenna. The conductor dimension is a measure of size of a conductive portion of the antenna that substantially affects the loading effect. In one example, the dimension is considered to substantially affect the loading effect when changing of the dimension may produce a measurable change in performance of the wireless communication. Performance of the wireless communication is evaluated using the antenna based on one or more performance criteria. For example, one or more parameters representative of the performance of the wireless communication are measured and compared to one or more corresponding thresholds specified in the one or more performance criteria. Examples of such one or more parameters include various received signal strength indicators and various data transmission error rates associated with the wireless communication. The conductor dimension is approximately minimized while the performance satisfies the one or more performance criteria. The performance satisfies the one or more performance criteria when, for example, each of the one or more parameters representative of the performance of the wireless communication reaches or exceeds its corresponding specified threshold. An example of such conductor dimension minimization is discussed in U.S. Patent Application Publication No. US 2015/0030190 A1.

In various embodiments, the present subject matter can provide hearing aids with virtually equivalent free-space and on-head performances of wireless communication, which is an improvement over existing hearing aid antenna designs in the radiation efficiency. The improvement of the on-head performance is on the order of several decibels as shown by simulations and measurements.

In various embodiments, the present subject matter can provide an antenna structure which is unique in that it does not exhibit a degradation in performance when it is placed with the hearing aid on a large and lossy structure posed by the head of the hearing aid wearer.

In various embodiments, the present subject matter can provide hearing aids with more efficient wireless communication and therefore better wireless links in the most dominant and critical use case of a hearing aid: while it is being worn.

The present subject matter can be applied to eliminate the use of certain hearing aid circuit components such as a tuning circuit that can be adjusted for individual wearers and/or environments, and prevents the hearing aid from failing to be tuned when it goes onto the wearer's head from free space. In various embodiments, the present subject matter facilitates miniaturization of wireless hearing aids and improves antenna performance by reducing deteriorating effects of human body loading.

Figure 7:
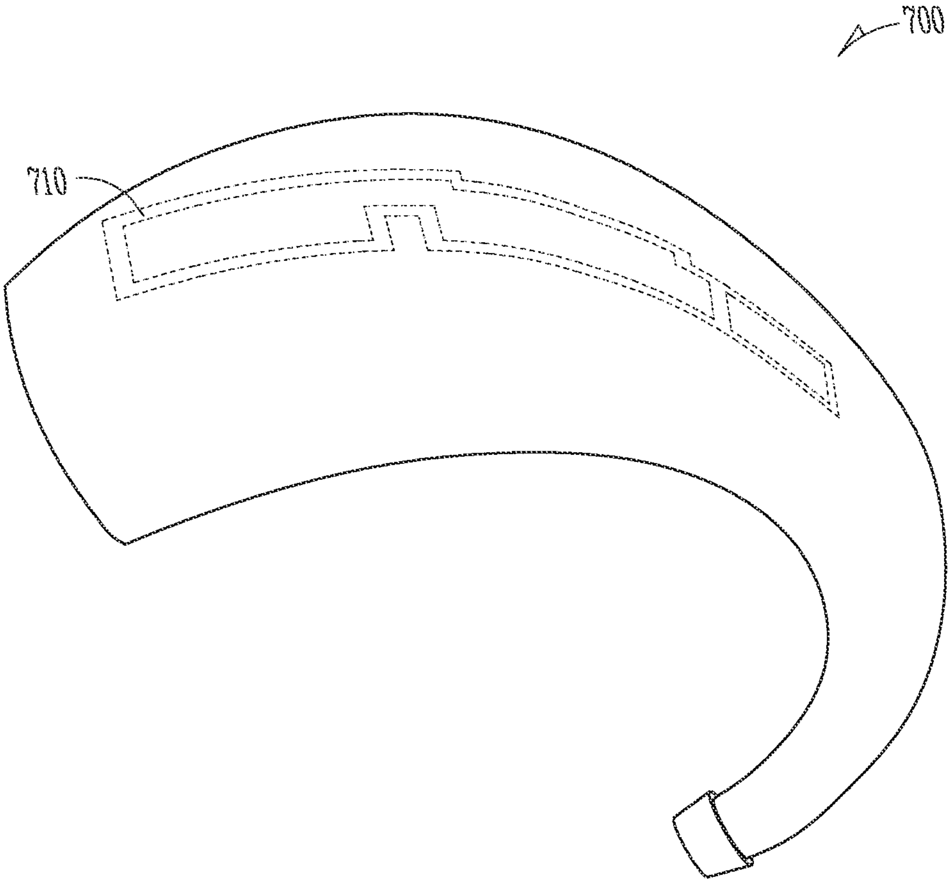
FIG. 7 is an illustration of an exemplary embodiment of a hearing aid having an antenna with an approximately optimized orientation.

FIG. 7 is an illustration of an exemplary embodiment of a hearing aid 700 having an antenna 710 with an approximately optimized orientation. Antenna 710 include a conductive loop that has an approximately planar and rectangular shape. In the illustrated embodiment, hearing aid 700 is a BTE type hearing aid. The optimization as discussed in this document is applied with design constraints including the size and shape of the BTE type hearing aid housing. When hearing aid 700 is properly worn on the wearer's head, antenna 710 is oriented with the normal to the plane of the loop approximately parallel to the wearer's sagittal plane, approximately parallel to the wearer's coronal plane, and approximately perpendicular to the wearer's transverse plane (i.e., approximately in the direction of the Z-axis as defined above with reference to FIG. 4A). In an exemplary embodiment, the conductive loop of antenna 710 is constructed as a copper trace having a thickness of about 2 mils and a width of about 80 mils. To minimize head loading on antenna 710, the conductive loop is placed such that the shortest edge of the antenna (the 2-mil thickness) is approximately parallel to the human tissue from both the head and the ear when hearing aid 710 is properly worn on the wearer. In the exemplary embodiment as illustrated in FIG. 7, antenna 710 has three sections providing the conductive loop with a shape that approximately follows a contour of the housing of heard aid 700. A first section is separated from an adjacent, second section by a bridge, which extends from a first side of the antenna to a second side of the antenna. The second section is separated from an adjacent, third section by a notch. Each of these three sections has a different shape and can be approximately planar.

The orientation of the loop of antenna 710 also provides for an approximately maximum far-field gain for hearing 710 to communicate with another device (other than another hearing aid worn by the same wearer) while maintaining a channel gain required for performing ear-to-ear communication with another hearing aid worn on the opposite side of the wearer's head.

In various embodiments, the optimization of the configuration (including various dimensions) and/or orientation of the antenna can include balancing of factors including the head loading, the performance of wireless communication (including far-field and/or ear-to-ear communications), and various design constraints. Hearing aid 700 including antenna 710 an example of applying such optimization. Depending on the performance of the wireless communication as simulated and/or experimentally measured and whether the head loading can be further reduced to a significant or measurable extent, the length of the conductive loop of antenna 710 that is parallel to human tissue when hearing aid 700 is properly worn may be further reduced to further reduce the lead loading, for example. In various embodiment, the head loading can be reduced to achieve virtually equivalent free-space performance and on-head performance for the wireless communication.

Hearing devices typically include at least one enclosure or housing, a microphone, hearing device electronics including processing electronics, and a speaker or "receiver." Hearing devices may include a power source, such as a battery. In various embodiments, the battery may be rechargeable. In various embodiments multiple energy sources may be employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing aids include a processor. In digital hearing aids with a processor, programmable gains may be employed to adjust the hearing aid output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

Various embodiments of the present subject matter support wireless communications with a hearing device. In various embodiments the wireless communications can include standard or nonstandard communications. Some examples of standard wireless communications include, but are not limited to, Bluetooth™, low energy Bluetooth, IEEE 802.11 (wireless LANs), 802.15 (WPANs), and 802.16 (WiMAX). Cellular communications may include, but are not limited to, CDMA, GSM, ZigBee, and ultra-wideband (UWB) technologies. In various embodiments, the communications are radio frequency communications. In various embodiments the communications are optical communications, such as infrared communications. In various embodiments, the communications are inductive communications. In various embodiments, the communications are ultrasound communications. Although embodiments of the present system may be demonstrated as radio communication systems, it is possible that other forms of wireless communications can be used. It is understood that past and present standards can be used. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new protocols may be employed without departing from the scope of the present subject matter.

In various embodiments, the present subject matter is used in hearing devices that are configured to communicate with mobile phones. In such embodiments, the hearing device may be operable to perform one or more of the following: answer incoming calls, hang up on calls, and/or provide two way telephone communications. In various embodiments, the present subject matter is used in hearing devices configured to communicate with packet-based devices. In various embodiments, the present subject matter includes hearing devices configured to communicate with streaming audio devices. In various embodiments, the present subject matter includes hearing devices configured to communicate with Wi-Fi devices. In various embodiments, the present subject matter includes hearing devices capable of being controlled by remote control devices.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer.

The present subject matter may be employed in hearing devices, such as hearing aids, headsets, speakers, cochlear implants, bone conduction devices, personal listening devices, headphones, and other hearing devices.

The present subject matter may be employed in hearing devices having additional sensors. Such sensors include, but are not limited to, magnetic field sensors, telecoils, temperature sensors, accelerometers and proximity sensors.

The present subject matter is demonstrated for hearing devices, including hearing aids, including but not limited to, behind-the-ear (BTE), in-the-ear (ITE), in-the-canal (ITC), receiver-in-canal (RIC), invisible-in-the-canal (IIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing device configured to be worn by a wearer having an ear and to perform wireless communication with another device, the hearing device comprising:

a housing sized and shaped for placement behind the ear or over the ear; and an antenna configured for performing the wireless communication, the antenna disposed in the housing and including a conductive loop defining an upper surface profile, wherein a normal to the surface profile of the conductive loop is approximately parallel the wearer's sagittal plane when the hearing device is worn by the wearer behind the ear or over the ear.

2. The hearing device of claim 1, wherein the antenna defines three sections.

3. The hearing device of claim 2, wherein the three sections have different shapes.

4. The hearing device of claim 2, wherein one or more of the three sections is approximately planar.

5. The hearing device of claim 4, wherein the three sections provide the conductive loop with a shape that follows a contour of the housing.

6. The hearing device of claim 2, wherein a first section of the three sections is separated from an adjacent second section of the three sections by a bridge.

7. The hearing device of claim 6, wherein the bridge extends from a first side of the antenna to a second side of the antenna.

8. The hearing device of claim 6, wherein the second section is separated from an adjacent third section by a notch.

9. The hearing device of claim 6, wherein the antenna comprises a flex surface substrate.

10. The hearing device of claim 6, wherein the antenna has a shape approximately following a contour of the housing.

11. The hearing device of claim 10, wherein the antenna comprises a flex circuit antenna including a flex circuit substrate and the conductive loop constructed as a conductor trace on the flex circuit substrate.

12. The hearing device of claim 1, wherein the antenna is orientated relative to the housing for the normal to the surface profile of the conductive loop to be approximately perpendicular to the wearer's transverse plane when the hearing device is worn by the wearer.

13. The hearing device of claim 1, wherein the conductive loop has an approximately rectangular shape.

14. A hearing device configured to be worn on a head of a wearer having an ear and to perform wireless communication including ear-to-ear communication with another hearing device worn on the head and far-field communication with a peripheral device, the hearing device comprising:

a housing sized and shaped for placement behind the ear or over the ear; and a loop antenna placed in the housing and optimized for performing the wireless communication within design constraints including the size and shape of the housing, the loop antenna including an approximately planar portion being approximately perpendicular to a portion of a surface of the head that is adjacent to the loop antenna when the hearing device is worn behind the ear or over the ear.

15. The hearing device of claim 14, wherein the loop antenna is oriented relative to the housing to minimize a capacitance formed between the antenna and the head of the wearer.

16. The hearing device of claim 14, wherein the antenna is oriented relative to the housing to maximize a far-field gain for the far-field communication with the peripheral device.

17. The hearing device of claim 14, wherein the antenna is oriented relative to the housing for maintaining a channel gain required for the ear-to-ear communication with the other hearing aid.

18. The hearing device of claim 17, wherein the antenna is oriented relative to the housing to maximize a far-field gain for the far-field communication with the peripheral device while maintaining a channel gain required for the ear-to-ear communication with the other hearing device.

19. The hearing device of claim 14, comprising a receiver-in-canal (RIC) hearing device including the housing and the loop antenna.

20. The hearing device of claim 14, comprising a receiver-in-the-ear (RITE) hearing device including the housing and the loop antenna.

21. A hearing aid configured to be worn by a wearer having an ear and to perform wireless communication with another device, the hearing aid comprising:

a behind-the-ear (BTE) type hearing aid housing;

an antenna placed in the behind-the-ear type hearing aid housing, the antenna including an approximately planar portion that is approximately perpendicular to the wearer's sagittal plane when the hearing aid is worn by the wearer behind the ear or over the ear; and a communication circuit configured to perform the wireless communication using the antenna.

22. The hearing aid of claim 21, wherein the approximately planar portion is approximately parallel the wearer's transverse plane when the hearing aid is worn by the wearer.

23. The hearing aid of claim 21, wherein the antenna is configured to minimize a capacitance between the antenna and the wearer when the hearing aid is worn by the wearer.

24. The hearing aid of claim 21, wherein the antenna comprises a flex circuit antenna including a conductor trace on a flex circuit substrate.

* * * * *